(12) United States Patent
Wang et al.

(10) Patent No.: US 10,934,199 B2
(45) Date of Patent: Mar. 2, 2021

(54) COMPOSITE DECALCIFICATION AGENT

(71) Applicant: GuangXi University, Nanning (CN)

(72) Inventors: Shuangfei Wang, Nanning (CN); Jian Zhang, Nanning (CN); Chengrong Qin, Nanning (CN); Ling Peng, Nanning (CN); Shanshan Zhao, Nanning (CN); Peng Gan, Nanning (CN); Zhiwei Wang, Nanning (CN)

(73) Assignee: GuangXi University, Guangxi (CN)

( * ) Notice: Subject to any disclaimer, the term of this patent is extended or adjusted under 35 U.S.C. 154(b) by 0 days.

(21) Appl. No.: 16/864,209

(22) Filed: May 1, 2020

(65) Prior Publication Data

US 2021/0032147 A1 Feb. 4, 2021

(30) Foreign Application Priority Data

Jul. 31, 2019 (CN) .......................... 201910701238.X

(51) Int. Cl.
*C02F 11/04* (2006.01)
*C02F 103/28* (2006.01)
*C02F 103/06* (2006.01)
*C02F 103/32* (2006.01)

(52) U.S. Cl.
CPC .......... *C02F 11/04* (2013.01); *C02F 2103/06* (2013.01); *C02F 2103/28* (2013.01); *C02F 2103/32* (2013.01); *C02F 2209/003* (2013.01)

(58) Field of Classification Search
CPC ...... C02F 5/14; C02F 1/66; C02F 3/28; C02F 5/086
USPC .................................. 210/631, 697
See application file for complete search history.

(56) References Cited

U.S. PATENT DOCUMENTS 5,024,783 A * 6/1991 Busch ................ C02F 5/14
252/180
2013/0256226 A1* 10/2013 Tanaka ................ B01D 61/58
210/631

OTHER PUBLICATIONS

Van Langerak et al, "Influence of phosphate and iron on the extent of calcium carbonate precipitation during anaerobic digestion", Journal of Chemical Technology and Biotechnology, vol. 74, pp. 1030-1036 (Year: 1999).*

* cited by examiner

*Primary Examiner* — Claire A Norris
(74) *Attorney, Agent, or Firm* — LeonardPatel PC

(57) ABSTRACT

Embodiments of the present invention pertain to a composite decalcification agent of calcified anaerobic granular sludge and a decalcification regeneration process.

7 Claims, 1 Drawing Sheet

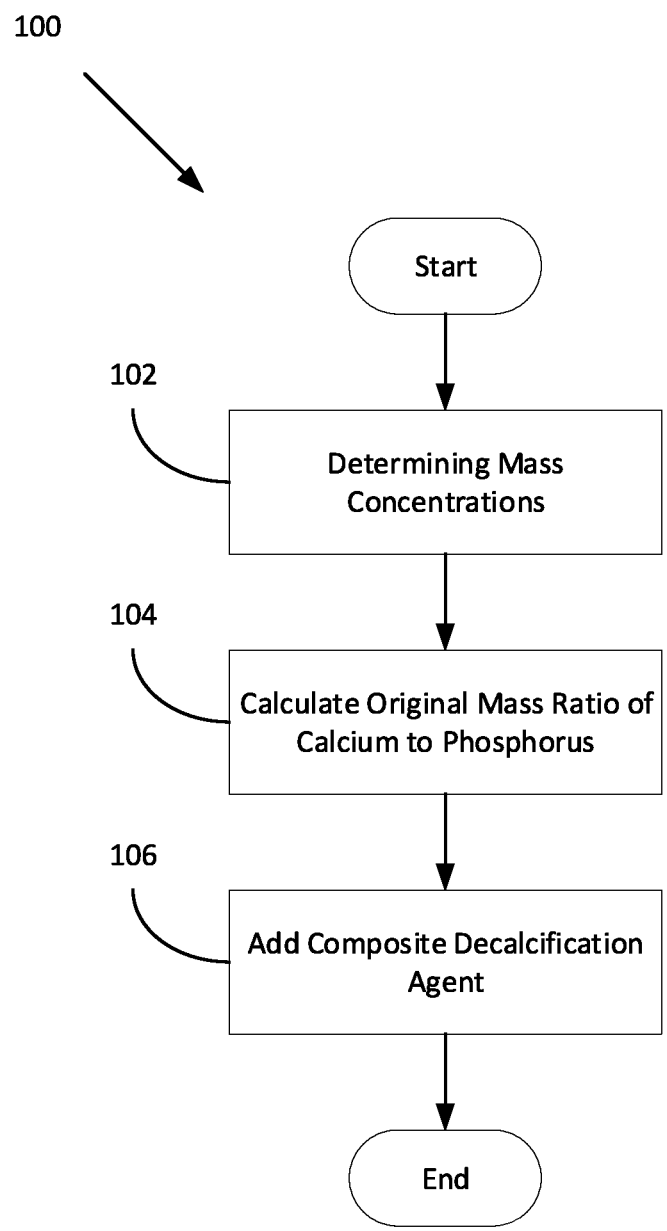

COMPOSITE DECALCIFICATION AGENT

CROSS-REFERENCE TO RELATED APPLICATION

This application claims the benefit of Chinese Patent Application No. 201910701238.X, filed on Jul. 31, 2019. The subject matter thereof is hereby incorporated herein by reference in its entirety.

FIELD

The present invention relates to a composite decalcification agent, and more particularly, to a composite decalcification agent of calcified anaerobic granular sludge and a decalcification regeneration process.

BACKGROUND

Anaerobic biological treatment technology is suitable for high concentration organic wastewater, among which anaerobic granular sludge technology is widely utilized in the fields of pulping and papermaking, monosodium glutamate, bean/dairy product wastewater, landfill leachate, etc. The long-term practice of anaerobic biological treatment has shown that the high content of calcium ion ($Ca^2$) in the initial wastewater leads to the accumulation of inorganic components, such as calcium carbonate and hydroxyapatite in the anaerobic granular sludge. Further, the long-term practice of anaerobic biological treatment also has shown to reduce the total active microbial biomass in the anaerobic reactor and cause the collapse of the anaerobic system. The above phenomenon is called "granular sludge calcification."

Existing prevention and control measures for granular sludge calcification contain pretreatment (e.g., controlling the pH value of influent, pre-decalcification softening, etc.), sludge management (e.g., calcification sludge discharge, screening, reflux culture, etc.), and microbial strengthening methods (e.g., adding specific fermentative hydrogen-producing and acid-producing bacteria to weaken the calcium precipitation microenvironment of anaerobic granular sludge). Microbial-induced calcite precipitation (MICP) refers to the precipitation of carbonate from supersaturated solution due to microbial cells and their biochemical activities.

However, because of the stability of the internal microenvironment of anaerobic granular sludge, none of the above measures fundamentally solve the internal calcification of granular sludge caused by the mechanism of MICP.

Since the high-efficiency anaerobic reactor utilizes the sludge with high retention density and good sedimentation, the removal of calcified core in the anaerobic granular sludge is necessary to solve the problem of replacing the low-activity calcification sludge with the high-activity anaerobic granular sludge. Currently, the main engineering measures include replenishing fresh sludge and hydraulic sorting of calcified sludge.

However, it is difficult for these measures to solve the problems in a long-term controllable and economically-feasible way.

Accordingly, a composite decalcification agent of calcified anaerobic granular sludge may be beneficial.

SUMMARY

Certain embodiments of the present invention may provide solutions to the problems and needs in the art that have not yet been fully identified, appreciated, or solved by current anaerobic biological treatment technologies. For example, some embodiments of the present invention pertain to a composite decalcification agent of calcified anaerobic granular sludge and a decalcification regeneration process.

In an embodiment, a composite decalcification agent of calcified anaerobic granular sludge includes 40% to 85% phosphoric acid, 10% to 25% sodium tripolyphosphate, and 1 to 10% sodium lignosulfonate by a mass fraction.

In another embodiment, a process for characterization of a decalcification and regeneration of a composite decalcification agent of calcified anaerobic granular sludge includes adding a predefined amount of the composite decalcification agent to influent of an anaerobic reactor according to a mass ratio of calcium to phosphorus in a treatment system of anaerobic granular sludge for highly calcified wastewater. The mass ratio of calcium to phosphorous is 10-25:1.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a flow diagram illustrating a decalcification regeneration process 100, according to an embodiment of the present invention.

DETAILED DESCRIPTION OF THE EMBODIMENTS

Some embodiments generally pertain to solving the problem of granular sludge calcification caused by MICP. To solve the problem, some embodiment includes a composite decalcification agent of calcified anaerobic granular sludge and a decalcification regeneration process. The composite decalcification agent and process is simple in operation, low in cost, reliable in practicability, and effectively realizes the decalcification regeneration of calcified anaerobic granular sludge, thereby reducing the content of inorganic components. Further, the composite decalcification agent simultaneously prevent the calcification in the core of anaerobic granular sludge during the anaerobic treatment process of high calcium wastewater.

In some embodiments, the composite decalcification agent of calcified anaerobic granular sludge is comprised of 40% to 85% phosphoric acid, 10% to 25% sodium tripolyphosphate, and 1% to 10% sodium lignosulfonate by a mass component. It should be appreciated that the lower the pH of the feed water, the higher the proportion of sodium tripolyphosphate and sodium lignosulfonate in the formula.

In some embodiments, the composite decalcification agent of calcified anaerobic granular sludge is prepared by intermingling phosphoric acid, sodium tripolyphosphate, and sodium lignosulfonate, and dissolving the intermingled phosphoric acid, sodium tripolyphosphate, and sodium lignosulfonate with water to configure an aqueous solution.

In certain embodiments, high-calcium wastewater involves waste paper pulping wastewater, food processing wastewater, landfill leachate, or fermentation wastewater.

Also, in certain embodiments, the decalcification regeneration process of a composite decalcification agent of calcified anaerobic granular sludge supplements the composite decalcification agent to an influent of the anaerobic reactor with a final mass proportion of calcium to phosphorus (10-25:1) in a treatment system of anaerobic granular sludge for highly calcified wastewater.

FIG. 1 is a flow diagram illustrating a decalcification regeneration process 100, according to an embodiment of the present invention. In some embodiments, process 100 begins at 102 with determining mass concentrations of $Ca^{2+}$ and $P_2O_5^{3-}$. At 104, the original mass ratio of calcium to phosphorus is calculated in highly calcified wastewater. Using this calculation, at 106, a composite decalcification agent is added to an influent reservoir of an anaerobic reactor to regulate a final mass ratio of calcium to phosphorus. It should be noted that the addition of the decalcification agent is according to the mass ratio of calcium to phosphorus=10-25:1.

Technical Principal

It should be appreciated that organic acid is formed in the anaerobic granular sludge. This organic acid reacts with calcium precipitation to produce calcium ions. The calcium ions configure a water-soluble chelate with the electronegative anion provided by the composite decalcification agent. This promotes the calcium precipitation to be converted into soluble calcium, which can be removed from the anaerobic granular sludge.

It should also be appreciated that an inner calcium precipitation in granular sludge is prevented by regulating the carbonate crystal morphology formed by MICP. In some embodiments, anions supplied by the composite decalcification agent acts as a blocking agent. For example, the anions inhibit the calcium precipitation ions from arranging on a regular lattice through lattice distortion and dispersion. This way, loose and fluffy amorphous calcium is inclined to attach to a surface layer of the granular sludge. The loose and fluffy amorphous calcium is then eluted under hydraulic shearing, which makes it difficult to enter the anaerobic granular sludge to form calcium precipitation.

Also, the addition of sodium tripolyphosphate and sodium lignosulfonate may alleviate the impact of phosphoric acid on the pH of the influent water. This addition also mitigates the effect of the utilization of the composite phosphorus-based calcification inhibitor on the microenvironment of the anaerobic microorganism, and ensures that the performance of the anaerobic reactor is not adversely affected by the employment of the invention.

Advantages

By preparing and applying the composite decalcification agent, the principle of complexing and solubilizing is utilized to ensure that the organic acid (formed in the anaerobic granular sludge) reacts with calcium precipitation. This also ensures that the calcium ion produced configures a water-soluble chelate with the electronegative anion provided by the composite decalcification agent. This may promote the calcium precipitation to be converted into soluble calcium. It should be noted that the soluble calcium can be removed from the anaerobic granular sludge to realize the in-situ decalcification under the normal continuous operation condition of an anaerobic reactor.

Further, by preparing and applying the composite decalcification agent, some embodiments change the precipitation form of calcium scale. Additionally, some embodiments realize the separation of calcium precipitation and anaerobic granular sludge by hydraulic shearing. The agent dosage in some embodiments is flexibly adjusted according to the mass ratio of calcium to phosphorus and pH value in the influent. In certain embodiments, the operation is simple, the cost is low, and the practicability is strong. Some further embodiments prevent and block the calcification process of anaerobic granular sludge, and ensure long-term stable and efficient treatment of high calcium wastewater in the anaerobic reactor.

After anaerobic treatment, the residual composite decalcification agent can be a phosphorus resource required for the subsequent aerobic biological treatment. The subsequent aerobic biological treatment may avoid the extra addition of nutrients, such as active phosphorus, and the adverse impact on the effluent quality of the wastewater treatment system.

By supplementing the composite decalcification agent into the influent of the anaerobic reactor, the internal calcium precipitation is inhibited in the granular sludge, which is formed by free calcium ion. This promotes the calcium precipitation in the anaerobic granular sludge to form chelate and return to the wastewater phase, realizing the decalcification regeneration of the calcified anaerobic granular sludge, and maintaining the activity of the anaerobic granular sludge. By supplementing the composite phosphorus-based calcification inhibitor to the influent of the anaerobic reactor, the internal calcium precipitation is inhibited in the granular sludge, which is formed by free calcium ion. The activity of the anaerobic granular sludge may then be maintained. By preventing calcium precipitation in the sludge core and strengthening the chelating dissolution of calcium precipitation, the problem of reducing the capacity of anaerobic reaction system due to sludge calcification deactivation in the fields of wastepaper pulping, food processing, landfill leachate, fermentation, is solved. It should be noted that this problem is solved without sludge removal and descaling in the anaerobic reactor and has a significant value in the application.

EXAMPLE EMBODIMENTS

The following examples may include conditions for preparation and application and are only for the explanation for the typical case. Further, these examples should not be construed as limitations on the different embodiments.

After operation of the anaerobic reactor, ash change rate of calcified anaerobic granular sludge is used as the reference standard for the decalcification degree of sludge. The decalcification rate is shown as follows:

$$d_t = \frac{Ash_I - Ash_t}{Ash_I} * 100\%$$

where $d_t$ is the decalcification rate at day t after decalcification regeneration, %; $Ash_I$ and $Ash_t$ are the ash content of anaerobic granular sludge at the initial and operational day t, respectively.

The calcium ion interception rate is employed as the reference standard for the calcification blocking of anaerobic granular sludge. Further the calcium ion interception rate is calculated by the concentration of influent and effluent in the anaerobic reactor, as shown in the following formula:

$$r = \frac{C_{In} - C_{Out}}{C_{In}} * 100\%$$

where r is the calcium ion interception rate, %; $C_{In}$ and $C_{Out}$ are the calcium ion concentration of influent and effluent in the anaerobic reactor, respectively.

Example 1: The Treatment of Wastepaper Pulp Wastewater

The initial ash content of anaerobic granular sludge is 0.64 g/gTS;

The typical quality of wastepaper pulping wastewater are COD 1500-5000 mg/L, $Ca^{2+}$ 300-1200 mg/L, total phosphorous 0.5-2 mg/L, pH value 6.2-7.5;

Since the pH value of the wastewater is close to the appropriate pH range of anaerobic granular sludge, the composite decalcification agent should be close to neutral, as shown in the formula: 65% phosphoric acid, 25% sodium tripolyphosphate, 10% sodium lignosulfonate, all of which are dissolved in water and obtain ten wt % aqueous solution to prepare a composite decalcification agent.

According to the actual calcium ion concentration of the wastewater, the dosage of the composite decalcification agent per ton of water is calculated based on the mass ratio of calcium to phosphorus (10-25:1). This was calculated after the composite decalcification agent is added to the influent regulating reservoir of the anaerobic reactor.

The control experiments showed that the addition of the combined decalcification agent significantly inhibit the interception of calcium ions by anaerobic granular sludge in the anaerobic reactor. This reduced the interception rate of calcium ions from 28.6% to −6.7%~−12.1% and decalcification rate of anaerobic granular sludge to 55.6%. This also decreased the ash proportion in anaerobic granular sludge.

TABLE 1

A control experiment on the treatment of wastepaper pulp wastewater

| Time (t), d | Decalcination rate ($d_r$), % | Calcium ion interception rate (r), % |
|---|---|---|
| 0 | — | 28.6 |
| 15 | 15.5 | −12.1 |
| 30 | 20.8 | −10.1 |
| 45 | 41.9 | −9.4 |
| 60 | 55.6 | −6.7 |

Example 2: The Treatment of Landfill Leachate

The initial ash content of anaerobic granular sludge is 0.55 g/gTS. In some cases, the typical quality of landfill leachate are COD 5000-20000 mg/L, $Ca^{2+}$ 250-800 mg/L, total phosphorous 5-25 mg/L, ammonia nitrogen 400-1600 mg/L, pH value 8.0-8.5;

Since the pH value of the wastewater is alkaline, and since ammonia nitrogen concentration is high, free ammonia inhibition occurs under alkaline conditions. As a result, the combined decalcification agent of calcified anaerobic granular sludge needs to appear acidic, as shown in the formula: 85% phosphate, 10% sodium tripolyphosphate, 5% sodium lignosulfonate, adding water to dissolve and mix evenly to obtain the composite decalcification agent.

According to the actual calcium ion concentration of the wastewater, the dosage of the composite decalcification agent per ton of water is calculated based on the mass ratio of calcium to phosphorus (25-30:1). This occurred when the composite decalcification agent was added to the influent regulating reservoir of the anaerobic reactor.

The control experiments showed that the addition of the combined decalcification agent significantly inhibits the interception of calcium ions by anaerobic granular sludge in the anaerobic reactor. This reduced the interception rate of calcium ions from 28.5% to −7.7%~−15.3% and decalcification rate of anaerobic granular sludge to 55.6%. This also decreased the ash proportion in anaerobic granular sludge.

TABLE 2

A control experiment on the treatment of landfill leachate by anaerobic granular sludge

| Time (t), d | Decalcination rate ($d_r$), % | Calcium ion interception rate (r), % |
|---|---|---|
| 0 | — | 28.5 |
| 15 | 6.2 | −15.3 |
| 30 | 11.8 | −11.3 |
| 45 | 26.9 | −8.0 |
| 60 | 43.2 | −7.7 |

Example 3: The Treatment of Fermentation Wastewater

The initial ash content of anaerobic granular sludge is 0.43 g/gTS. In some examples, the typical quality of fermentation wastewater are COD 18000-40000 mg/L, $Ca^{2+}$ 250-1000 mg/L, total phosphorous 15-45 mg/L, ammonia nitrogen 13000-16000 mg/L, pH value 2.2-2.6;

Since the pH value of the wastewater is acidic, the composite decalcification agent of calcified anaerobic granular sludge needs to be slightly alkaline, as shown in the formula: 40% phosphoric acid, 15% sodium tripolyphosphate and 1% sodium lignosulfonate. Water is then added to dissolve and mix evenly to obtain the composite decalcification agent.

According to the actual calcium ion concentration of the wastewater, the dosage of the composite decalcification agent per ton of water is calculated based on the mass ratio of calcium to phosphorus (10-25:1). This occurs when the composite decalcification agent is added to the influent regulating reservoir of the anaerobic reactor.

The control experiments showed that the addition of the combined decalcification agent significantly inhibits the retention of calcium ions in anaerobic granular sludge. This reduces the interception rate of calcium ions from 31.5% to −7.7%~−15.3% and decalcification rate of anaerobic granular sludge to 57.9%. Further, the ash proportion in anaerobic granular sludge is also decreased.

TABLE 3

A control experiment on the treatment of fermentation wastewater by anaerobic granular sludge

| Time (t), d 时间 (t), d | Decalcination rate ($d_r$), % 脱钙率 ($d_r$), % | Calcium ion interception rate (r), % 钙截留率 (r), % |
|---|---|---|
| 0 | — | 31.5 |
| 15 | 10.5 | −19.8 |
| 30 | 27.8 | −18.3 |
| 45 | 41.8 | −15.0 |
| 60 | 57.9 | −7.7 |

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A calcified anaerobic granular sludge, comprising:
a composite decalcification agent comprising 40% to 85% phosphoric acid, 10% to 25% sodium tripolyphosphate, and 1 to 10% sodium lignosulfonate by a mass fraction, configured to remove calcium to maintain activity of the anaerobic granular sludge, wherein
the composite decalcification agent is further configured to supply anions inhibiting calcium precipitation from arranging on a regular lattice through lattice distortion and dispersion, forming loose and fluffy amorphous calcium scale.

2. The composite decalcification agent of claim 1, wherein the 40% to 85% phosphoric acid, 10% to 25% sodium tripolyphosphate, and 1 to 10% sodium lignosulfonate is mixed and dissolved in water to produce an aqueous solution, wherein
the aqueous solution prepares the composite decalcification agent for the calcified anaerobic granular sludge.

3. The composite decalcification agent of claim 2, wherein the composite decalcification agent is applied in an anaerobic treatment of high-calcium wastewater reducing a calcification degree of anaerobic granular sludge, thereby realizing a decalcification regeneration of calcified sludge.

4. The composite decalcification agent of claim 3, wherein
the high-calcium wastewater comprises wastepaper pulping wastewater, food processing wastewater, landfill leachate, and/or fermentation wastewater.

5. A process for decalcification and regeneration of a composite decalcification agent of calcified anaerobic granular sludge, the process comprising:
adding a predefined amount of the composite decalcification agent to influent of an anaerobic reactor according to a mass ratio of calcium to phosphorus in a treatment system of anaerobic granular sludge for highly calcified wastewater, wherein
the mass ratio of calcium to phosphorous is 10-25:1, and
the composite decalcification agent comprises 40% to 85% phosphoric acid, 10% to 25% sodium tripolyphosphate, and 1 to 10% sodium lignosulfonate by a mass fraction, configured to remove calcium to maintain activity of the anaerobic granular sludge, wherein
the composite decalcification agent is further configured to supply anions inhibiting calcium precipitation from arranging on a regular lattice through lattice distortion and dispersion, forming loose and fluffy amorphous calcium scale.

6. The process of claim 5, further comprising:
determining mass concentrations of calcium ion ($Ca^{2+}$) and $P_2O_5^{3-}$ in highly calcified wastewater, ranging from 600 to 1800 $mgCa^{2+}/L$, and
calculating an original mass ratio of calcium to phosphorus.

7. The process of claim 6, further comprising:
adding the composite decalcification agent of the calcified anaerobic granular sludge to an influent reservoir of an anaerobic reactor to regulate a final mass ratio of calcium to phosphorus, wherein
the final mass ratio of calcium to phosphorus is regulated according to a proportion of calcium to phosphorus being equal to 10-25:1.

* * * * *